(12) United States Patent
Zhou et al.

(10) Patent No.: US 11,113,613 B2
(45) Date of Patent: *Sep. 7, 2021

(54) DETERMINING MODEL PARAMETERS USING SECRET SHARING

(71) Applicant: Advanced New Technologies Co., Ltd., Grand Cayman (KY)

(72) Inventors: Yashun Zhou, Hangzhou (CN); Lichun Li, Hangzhou (CN); Shan Yin, Hangzhou (CN); Huazhong Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,837

(22) Filed: Mar. 1, 2021

(65) Prior Publication Data

US 2021/0182711 A1 Jun. 17, 2021

Related U.S. Application Data

(63) Continuation of application No. 16/792,031, filed on Feb. 14, 2020, now Pat. No. 10,936,960, which is a
(Continued)

(30) Foreign Application Priority Data

Aug. 9, 2019 (CN) .......................... 201910734775.4

(51) Int. Cl.
*G06N 5/04* (2006.01)
*G06F 21/60* (2013.01)
(Continued)

(52) U.S. Cl.
CPC ............... *G06N 5/04* (2013.01); *G06F 17/16* (2013.01); *G06F 21/60* (2013.01); *G06N 20/00* (2019.01)

(58) Field of Classification Search
CPC ........... G06F 17/16; G06F 21/60; G06N 5/04; G06N 20/00
See application file for complete search history.

(56) References Cited

U.S. PATENT DOCUMENTS

| 10,936,960 B1 | 3/2021 | Zhou et al. |
| 2003/0112969 A1 | 6/2003 | Algesheimer et al. |

(Continued)

FOREIGN PATENT DOCUMENTS

| CN | 101425902 | 5/2009 |
| CN | 101882992 | 11/2010 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Benjamin P Geib
(74) *Attorney, Agent, or Firm* — Fish & Richardson P.C.

(57) ABSTRACT

This disclosure relates to determining model parameters using secret sharing. In some aspects, a first data party device obtains a first share of a Hessian matrix for a data processing model. The first data party device obtains, using secret sharing with the second data party device, a first share of a product of a random number matrix and the Hessian matrix. The first data party device, determines a first share of a first inverse matrix based on a second inverse matrix and the first share of the random number matrix. The first data party device determines the first inverse matrix, a first share of a product of the first inverse matrix and a gradient of a loss function of the data processing model, and a first share of a new model parameter for the data processing model.

22 Claims, 5 Drawing Sheets

Related U.S. Application Data continuation of application No. PCT/CN2020/071432, filed on Jan. 10, 2020.

(51) Int. Cl.
  *G06N 20/00* (2019.01)
  *G06F 17/16* (2006.01)

(56) References Cited

U.S. PATENT DOCUMENTS

| | | | |
|---|---|---|---|
| 2018/0107926 A1* | 4/2018 | Choi | G06N 3/063 |
| 2020/0193292 A1 | 6/2020 | Weng | |
| 2021/0042640 A1 | 2/2021 | Zhou et al. | |

FOREIGN PATENT DOCUMENTS

| | | |
|---|---|---|
| CN | 106487503 | 3/2017 |
| CN | 107533812 | 1/2018 |
| CN | 109977694 | 7/2019 |
| CN | 110580410 | 7/2019 |
| CN | 110472439 | 11/2019 |
| CN | 110555315 | 12/2019 |
| CN | 110555525 | 12/2019 |
| CN | 110569227 | 12/2019 |
| CN | 110569228 | 12/2019 |
| CN | 110580409 | 12/2019 |

OTHER PUBLICATIONS

International Search Report and Written Opinion in PCT Appln. No. PCT/CN2020/071432 dated Apr. 24, 2020, 9 pages (with full machine translation).

Kim, M., Lee, J., Ohno-Machado, L., & Jiang, X. (2019). Secure and differentially private logistic regression for horizontally distributed data. IEEE Transactions on Information Forensics and Security, 15, 695-710. (Year: 2019).

Li W Liu H Yang, P., & Xie, W. (2016). Supporting regularized logistic regression privately and efficiently. PloS one, 11(6), e0156479. (Year: 2016).

Nakamoto. "Bitcoin: A Peer-to-Peer Electronic Cash System," www.bitcoin.org, 2005, 9 pages.

\* cited by examiner

DETERMINING MODEL PARAMETERS USING SECRET SHARING

CROSS-REFERENCE TO RELATED APPLICATIONS

This application is a continuation of U.S. patent application Ser. No. 16/792,031, filed Feb. 14, 2020, which is a continuation of PCT Application No. PCT/CN2020/071432, filed on Jan. 10, 2020, which claims priority to Chinese Patent Application No. 201910734775.4, filed on Aug. 9, 2019, and each application is hereby incorporated by reference in its entirety.

TECHNICAL FIELD

Implementations of the present specification relate to the field of computer technologies, and in particular, to determining model parameters using secret sharing.

BACKGROUND

In the big data era, there are many data islands. Data is usually distributed among different enterprises. In consideration of competition and privacy protection, the enterprises do not trust each other completely. In some cases, cooperative security modeling needs to be performed between enterprises, so a data processing model is cooperatively trained by using data of the enterprises while data privacy of the enterprises is fully protected.

When the data processing model is cooperatively trained, a model parameter of the data processing model can be optimized and adjusted a plurality of times by using a model parameter optimization method.

SUMMARY

An objective of implementations of the present specification is to provide a model parameter determining method and apparatus, and an electronic device, so a model parameter of a data processing model can be determined through multiparty cooperation while data privacy is protected. Because data used to train the data processing model is distributed among parties in cooperative modeling, how to cooperatively determine the model parameter of the data processing model while data privacy is protected is a technical problem that needs to be urgently resolved at present.

To achieve the previous objective, one or more implementations of the present specification provide the following technical solutions:

According to a first aspect of one or more implementations of the present specification, a model parameter determining method is provided, applied to a first data party and including: secretly sharing a hessian matrix with a cooperation partner based on feature data and a share of a value of an activation function, to obtain a share of the hessian matrix; secretly sharing a first inverse matrix with the cooperation partner based on the share of the hessian matrix, to obtain a share of the first inverse matrix, where the first inverse matrix is an inverse matrix of the hessian matrix; and secretly sharing a new model parameter with the cooperation partner based on a share of an original model parameter, the share of the first inverse matrix, and a share of a gradient of a loss function, to obtain a share of the new model parameter.

According to a second aspect of one or more implementations of the present specification, a model parameter determining apparatus is provided, applied to a first data party and including: a first secret sharing (SS) unit, configured to secretly share a hessian matrix with a cooperation partner based on feature data and a share of a value of an activation function, to obtain a share of the hessian matrix; a second SS unit, configured to secretly share a first inverse matrix with the cooperation partner based on the share of the hessian matrix, to obtain a share of the first inverse matrix, where the first inverse matrix is an inverse matrix of the hessian matrix; and a third SS unit, configured to secretly share a new model parameter with the cooperation partner based on a share of an original model parameter, the share of the first inverse matrix, and a share of a gradient of a loss function, to obtain a share of the new model parameter.

According to a third aspect of one or more implementations of the present specification, an electronic device is provided, including: a memory, configured to store a computer instruction; and a processor, configured to execute the computer instruction to implement the method steps according to the first aspect.

According to a fourth aspect of one or more implementations of the present specification, a model parameter determining method is provided, applied to a second data party and including: secretly sharing a hessian matrix with a cooperation partner based on a share of a value of an activation function, to obtain a share of the hessian matrix; secretly sharing a first inverse matrix with the cooperation partner based on the share of the hessian matrix, to obtain a share of the first inverse matrix, where the first inverse matrix is an inverse matrix of the hessian matrix; and secretly sharing a new model parameter with the cooperation partner based on a share of an original model parameter, the share of the first inverse matrix, and a share of a gradient of a loss function, to obtain a share of the new model parameter.

According to a fifth aspect of one or more implementations of the present specification, a model parameter determining apparatus is provided, applied to a second data party and including: a first SS unit, configured to secretly share a hessian matrix with a cooperation partner based on a share of a value of an activation function, to obtain a share of the hessian matrix; a second SS unit, configured to secretly share a first inverse matrix with the cooperation partner based on the share of the hessian matrix, to obtain a share of the first inverse matrix, where the first inverse matrix is an inverse matrix of the hessian matrix; and a third SS unit, configured to secretly share a new model parameter with the cooperation partner based on a share of an original model parameter, the share of the first inverse matrix, and a share of a gradient of a loss function, to obtain a share of the new model parameter.

According to a sixth aspect of one or more implementations of the present specification, an electronic device is provided, including: a memory, configured to store a computer instruction; and a processor, configured to execute the computer instruction to implement the method steps according to the fourth aspect.

It can be seen from the previous technical solutions provided in the implementations of the present specification that in the implementations of the present specification, the first data party and the second data party can cooperatively determine the model parameter of the data processing model by using an SS algorithm without leaking their own data. In addition, because a Newton's method is used, the model parameter determining method in the implementations has a relatively high convergence speed, so a quantity of times of model parameter optimization and adjustment can be reduced, and training efficiency of the data processing model can be improved.

BRIEF DESCRIPTION OF DRAWINGS

To describe technical solutions in implementations of the present specification or in the existing technology more clearly, the following briefly describes the accompanying drawings needed for describing the implementations or the existing technology. Clearly, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Figure 1:
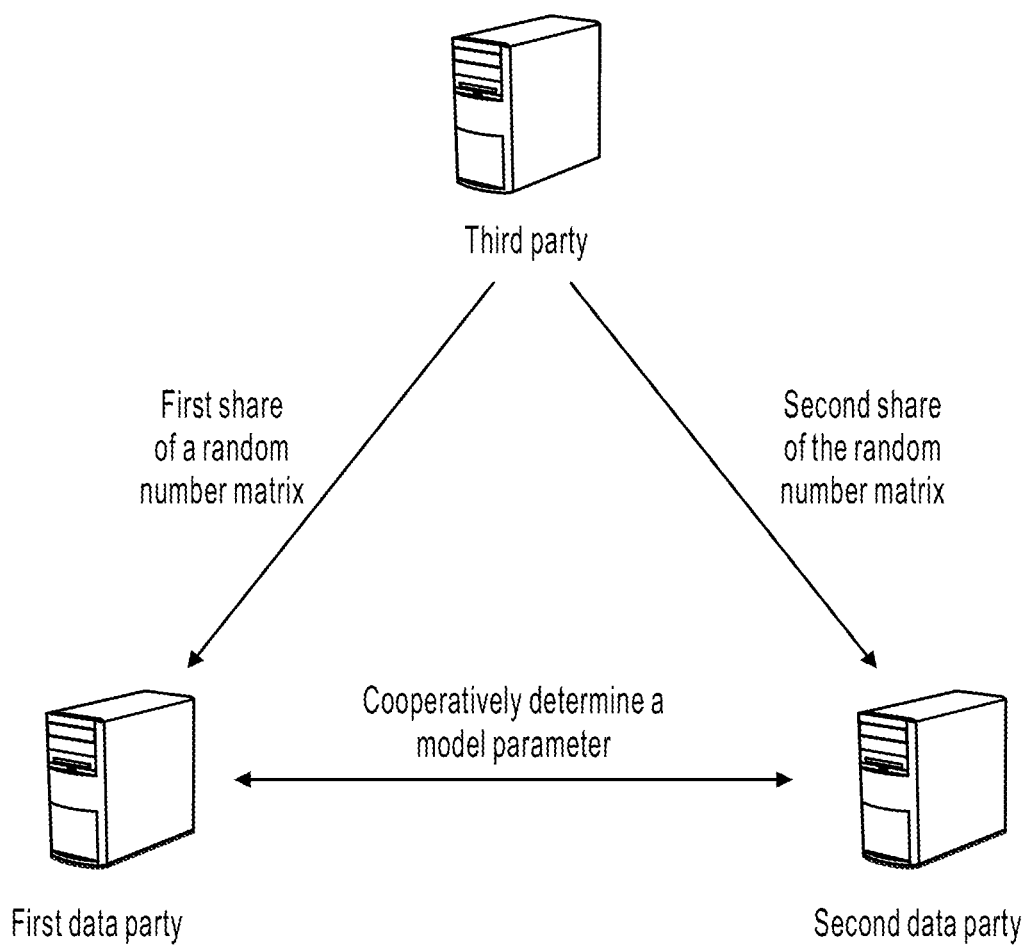
FIG. 1 is a schematic diagram illustrating a model parameter determining system, according to an implementation of the present specification.

The following clearly and comprehensively describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification. It should be understood that although terms "first", "second", "third", etc. can be used in the present specification to describe various types of information, the information is not limited to the terms. These terms are only used to differentiate between information of the same type. For example, without departing from the scope of the present specification, first information can also be referred to as second information, and similarly, the second information can be referred to as the first information.

A model parameter optimization method can include a gradient descent method, a Newton's method, etc. The Newton's method can include an original Newton's method and various variants based on the original Newton's method, such as a damped Newton's method and a regularized Newton's method. The regularized Newton's method is a Newton's method with a regularized term. Regularization can reduce complexity and instability of a model, thereby reducing a risk of overfitting. The Newton's method has a higher convergence speed than the gradient descent method. Therefore, if parties in cooperative modeling cooperatively determine a model parameter of a data processing model through secret sharing (SS) by using the Newton's method, not only data privacy of the parties in cooperative modeling can be protected, but also a quantity of times of model parameter optimization and adjustment can be reduced, and training efficiency of the data processing model can be improved.

SS is an algorithm for protecting data privacy. A plurality of data parties can perform cooperative calculation by using the SS algorithm without leaking their own data, to obtain secret information. Each data party can obtain a share of the secret information. A single data party cannot recover the secret information. The secret information can be recovered only when the plurality of data parties cooperate. For example, data party P owns data $x_1$, and data party $P_2$ owns data $x_2$. When the SS algorithm is used, data party $P_1$ and data party $P_2$ can perform cooperative calculation to obtain secret information $y=y_1+y_2=x_1x_2$. Data party $P_1$ can obtain share $y_1$ of secret information y after calculation, and data party $P_2$ can obtain share $y_2$ of secret information y after calculation.

In a cooperative security modeling scenario, to protect data privacy, a plurality of data parties can cooperatively train the data processing model based on their own data without leaking their own data. The data processing model can be a machine learning model. For example, the data processing model can includes, but is not limited to, a logistic regression model, a neural network model, etc. When the data processing model is trained, a model parameter of the data processing model can be optimized and adjusted by using the model parameter optimization method. The model parameter can be a machine learning model parameter, e.g., a weight or a bias of a machine learning model. In the cooperative security modeling scenario, data used to train the data processing model is distributed among data parties in cooperative modeling. Therefore, in the cooperative security modeling scenario, the model parameter optimization method can be implemented by using the SS algorithm.

A loss function can be used to measure a degree of inconsistency between a predicted value and a real value of the data processing model. A smaller value of the loss function indicates better robustness of the data processing model. The loss function includes but is not limited to a logarithmic loss function, a square loss function, etc.

A hessian matrix is a square matrix of second-order partial derivatives of the loss function, and is used to represent a local curvature of the loss function.

An activation function can be used to construct the data processing model. The activation function defines the output given the input. A non-linear factor can be added to the data processing model by using the activation function, to improve an expression capability of the data processing model. For example, the activation function can include a Sigmoid function, a Tan h function, a ReLU function, etc.

The present specification provides an implementation of a model parameter determining system.

Referring to FIG. 1, in this implementation, the model parameter determining system can include a first data party, a second data party, and a trusted third party (TTP).

The third party can be a server, or can be a server cluster including a plurality of servers. The third party can be used to provide a random number to each of the first data party and the second data party. Specifically, the third party can generate a random number matrix, divide each random number in the random number matrix into two shares, and use one of the two shares as a first share and use the other share of the two shares as a second share. The third party can use a matrix formed by first shares of the random numbers in the random number matrix as a first share of the random number matrix, use a matrix formed by second shares of the random numbers in the random number matrix as a second share of the random number matrix, send the first share of the random number matrix to the first data party, and send the second share of the random number matrix to the second data party. The sum of the first share of the random number matrix and the second share of the random number matrix is equal to the random number matrix.

The first data party and the second data party are respectively parties in cooperative security modeling. The first data party can be a data party that does not own a label, and the second data party can be a data party that owns a label. For example, the first data party can own complete feature data, and the second data party can own a label of the feature data. Or the first data party can own a part of data items of feature data, and the second data party can own another part of data items and a label of the feature data. Specifically, for example, the feature data can include a saving amount and a loan amount of a user. The first data party can own the saving amount of the user, and the second data party can own the loan amount of the user and the label of the feature data. The label can be used to distinguish between different types of feature data, and a specific value can be, for example, 0 and 1. The data party here can be an electronic device. The electronic device can include a personal computer, a server, a handheld device, a portable device, a flat panel device, and a multi-processor apparatus, or can include a cluster formed by any plurality of the previous apparatuses or devices. In addition, the feature data and the label corresponding to the feature data constitute sample data together, and the sample data can be used to train the data processing model.

In a cooperative security modeling scenario, the first data party and the second data party each can obtain a share of an original model parameter. Here, a share obtained by the first data party can be used as a first share of the original model parameter, and a share obtained by the second data party can be used as a second share of the original model parameter. The sum of the first share of the original model parameter and the second share of the original model parameter is equal to the original model parameter.

The first data party can receive the first share of the random number matrix. The second data party can receive the second share of the random number matrix. The first data party and the second data party can cooperatively determine a new model parameter through SS respectively based on the first share of the original model parameter, the feature data, and the first share of the random number matrix and based on the second share of the original model parameter, the label, and the second share of the random number matrix. The first data party and the second data party each can obtain a share of the new model parameter. For a specific process, references can be made to the following implementation of a model parameter determining method.

The present specification further provides an implementation of a model parameter determining method.

Figure 2:
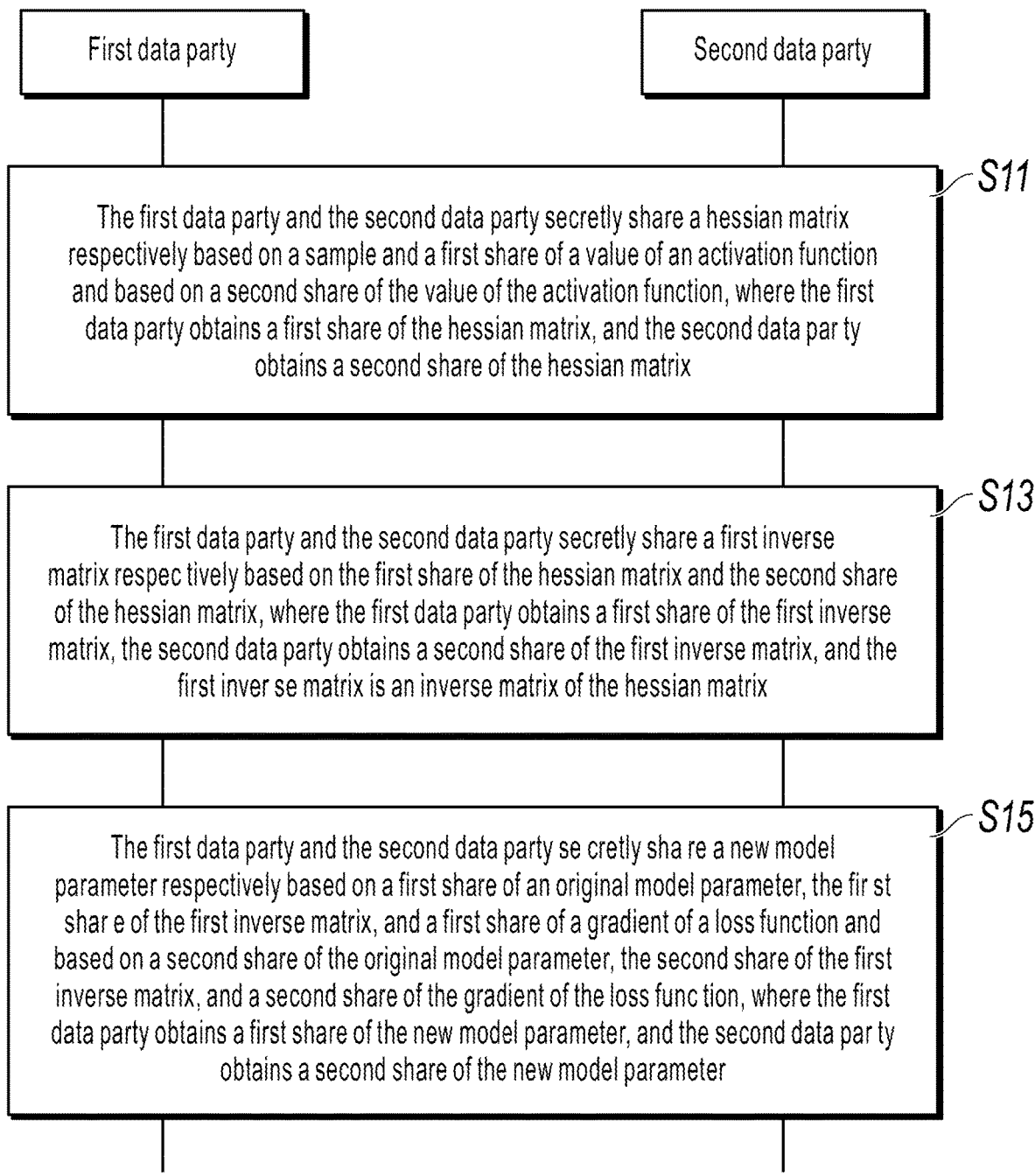
FIG. 2 is a flowchart illustrating a model parameter determining method, according to an implementation of the present specification.

In this implementation, a modified Newton's method can be used to determine a model parameter. Referring to FIG. 2, this implementation can include the following steps.

Step S11: A first data party and a second data party secretly share a hessian matrix respectively based on feature data and a first share of a value of an activation function and based on a second share of the value of the activation function, where the first data party obtains a first share of the hessian matrix, and the second data party obtains a second share of the hessian matrix.

Step S13: The first data party and the second data party secretly share a first inverse matrix respectively based on the first share of the hessian matrix and the second share of the hessian matrix, where the first data party obtains a first share of the first inverse matrix, the second data party obtains a second share of the first inverse matrix, and the first inverse matrix is an inverse matrix of the hessian matrix.

Step S15: The first data party and the second data party secretly share a new model parameter respectively based on a first share of an original model parameter, the first share of the first inverse matrix, and a first share of a gradient of a loss function and based on a second share of the original model parameter, the second share of the first inverse matrix, and a second share of the gradient of the loss function, where the first data party obtains a first share of the new model parameter, and the second data party obtains a second share of the new model parameter.

The following describes some terms in the implementations.

(1) A first product, a second product, and a third product: The first product can be a product of the original model parameter and the feature data. The second product can be a product of a random number matrix and the hessian matrix. The third product can be a product of the inverse matrix of the hessian matrix and the gradient of the loss function.

In some scenario examples, the first product can be represented as XW, where W represents the original model parameter that is specifically a vector formed by the original model parameter, and X represents the feature data that is specifically a matrix formed by the feature data.

The second product can be represented as HR, where H represents the hessian matrix, and R represents the random number matrix.

The third product can be represented as $H^{-1}dW$, where $H^{-1}$ represents the inverse matrix of the hessian matrix, dW represents the gradient of the loss function, and dW is a vector.

(2) The first inverse matrix and a second inverse matrix: Because the hessian matrix is a square matrix, inversion processing can be performed on the hessian matrix, and the inverse matrix of the hessian matrix can be used as the first inverse matrix. Because the second product can be a square matrix, inversion processing can be performed on the second product, and an inverse matrix of the second product can be used as the second inverse matrix.

In the previous scenario examples, the first inverse matrix can be represented as $H^{-1}$, and the second inverse matrix can be represented as $(HR)^{-1}$.

In some implementations, before step S1, the first data party and the second data party can secretly share the first product respectively based on the feature data and the first share that is of the original model parameter and that is owned by the first data party and based on the second share that is of the original model parameter and that is owned by the second data party. The first data party and the second data party each can obtain a share of the first product. For ease of description, a share obtained by the first data party can be used as a first share of the first product, and a share obtained by the second data party can be used as a second share of the first product. The sum of the first share of the first product and the second share of the first product is equal to the first product.

In the previous scenario examples, the first share of the original model parameter can be represented as $<W>_0$, and the second share of the original model parameter can be represented as $<W>_1$, where $<W>_0+<W>_1=W$. The first data party and the second data party can secretly share the first product XW respectively based on X and $<W>_0$ and based on $<W>_1$. The first data party can obtain the first share $<XW>_0$ of the first product, and the second data party can obtain the second share $<XW>_1$ of the first product, where $<XW>_0+<XW>_1=XW$.

Further, the first data party and the second data party can further secretly share a value of a polynomial respectively based on the first share of the first product and the second share of the first product. The first data party and the second data party each can obtain a share of the value of the polynomial. The polynomial can be used to fit the activation function of the data processing model. As such, a share obtained by the first data party can be used as the first share of the value of the activation function, and a share obtained by the second data party can be used as the second share of the value of the activation function. The sum of the first share of the value of the activation function and the second share of the value of the activation function is equal to the value of the activation function. Certainly, the present specification is not limited to the previous implementation of secretly sharing the value of the activation function through fitting by using the polynomial. The value of the activation function can be secretly shared by using another method.

In the previous scenario examples, the activation function can be a Sigmoid function. The value of the activation function can be represented as a=sigmoid(XW). The first share of the value of the activation function can be represented as $<a>_0$, and the second share of the value of the activation function can be represented as $<a>_1$, where $<a>_0+<a>_1=a$, and $<a>_0$ $<a>_1$ and a are vectors.

Further, the first data party and the second data party can further secretly share the gradient of the loss function respectively based on the feature data and the first share of the value of the activation function and based on a label and the second share of the value of the activation function. The first data party and the second data party each can obtain a share of the gradient of the loss function. For ease of description, a share obtained by the first data party can be used as the first share of the gradient of the loss function, and a share obtained by the second data party can be used as the second share of the gradient of the loss function. The sum of the first share of the gradient of the loss function and the second share of the gradient of the loss function is equal to the gradient of the loss function.

In the previous scenario examples, the first data party and the second data party can secretly share the gradient dW (which is specifically a vector) of the loss function respectively based on X and $<a>_0$ and based on label Y and $<a>_1$. The first data party can obtain the first share $<dW>_0$ of the gradient of the loss function, and the second data party can obtain the second share $<dW>_1$ of the gradient of the loss function.

The following describes a detailed process of secretly sharing the gradient of the loss function dW by the first data party and the second data party.

The first data party and the second data party can secretly share $X^T<a>_1$ respectively based on X and $<a>_1$. The first data party can obtain $<[X^T<a>_1]>_0$, and the second data party can obtain $<[X<a>_1]>_1$, where $<[X^T<a>_1]>_0+<[X^T<a>_1]>_1=X^T<a>_1$.

The first data party and the second data party can further secretly share $X^TY$ respectively based on X and label Y (which is specifically a vector formed by the label). The first data party can obtain $<X^TY>_0$, and the second data party can obtain $<X^TY>_1$, where $<X^TY>_0+<X^TY>_1=X^TY$.

The first data party can calculate $X^T<a>_0$, and can calculate $X^T<a>_0+<[X^T<a>_1]>_0-<X^TY>_0$ as the first share $<dW>_0$ of the gradient dW of the loss function, and the second data party can calculate $<[X^T<a>_1]>_1-<X^TY>_1$ as the second share $<dW>_1$ of the gradient dW of the loss function:

$$dW = \langle dW\rangle_0 + \langle dW\rangle_1$$
$$= X^T\langle a\rangle_0 + \langle[X^T\langle a\rangle_1]\rangle_0 - \langle X^TY\rangle_0 +$$
$$\langle[X^T\langle a\rangle_1]\rangle_1 - \langle X^Ty\rangle_1$$
$$= X^T\langle a\rangle_0 + X^T\langle a\rangle_1 - X^TY$$
$$= X^Ta - X^TY$$
$$= X^T(a-Y)$$

In some implementations, in step S11, the first data party and the second data party can secretly share the hessian matrix respectively based on the feature data and the first share of the value of the activation function and based on the second share of the value of the activation function. The first data party and the second data party each can obtain a share of the hessian matrix. For ease of description, a share obtained by the first data party can be used as the first share of the hessian matrix, and a share obtained by the second data party can be used as the second share of the hessian matrix. The sum of the first share of the hessian matrix and the second share of the hessian matrix is equal to the hessian matrix.

Specifically, the first data party and the second data party can secretly share a diagonal matrix respectively based on the share of the value of the activation function and the second share of the value of the activation function. The first data party and the second data party each can obtain a share of the diagonal matrix. For ease of description, a share obtained by the first data party can be used as a first share of the diagonal matrix, and a share obtained by the second data party can be used as a second share of the diagonal matrix. The sum of the first share of the diagonal matrix and the second share of the diagonal matrix is equal to the diagonal matrix. As such, the first data party and the second data party can secretly share the hessian matrix respectively based on the feature data and the first share of the diagonal matrix and based on the second share of the diagonal matrix. The first data party can obtain the first share of the hessian matrix, and the second data party can obtain the second share of the hessian matrix.

In the previous scenario examples, the first data party and the second data party can secretly share the diagonal matrix RNN respectively based on $<a>_0$ and $<a>_1$. The first data party can obtain the first share $RNN_0$ of the diagonal matrix, and the second data party can obtain the second share $RNN_1$ of the diagonal matrix.

The following describes a detailed process of secretly sharing the diagonal matrix RNN by the first data party and the second data party.

The first data party and the second data party can secretly share $<a>_0 \bullet <a>_1$ respectively based on $<a>_0$ and $<a>_1$. The first data party can obtain $<[<a>_0 \bullet <a>_1]>_0$, and the second data party can obtain $<[<a>_0 \bullet <a>_1]>_1$, where $<[<a>_0 \bullet <a>_1]>_0+<[<a>_0 \bullet <a>_1]>_1=<a>_0 \bullet <a>_1$, and • represents a bitwise multiplication operation. For example, if vector $m=(m_1,m_2,m_3)$ and vector $n=(n_1,n_2,n_3)$, $m \bullet n=(m_1 n_1, m_2 n_2, m_3 n_3)$.

The first data party can calculate $\langle r \rangle_0 = \langle a \rangle_0 - \langle [\langle a \rangle_0 \bullet \langle a \rangle_1] \rangle_0 - \langle a \rangle_0 \bullet \langle a \rangle_0$, and the second data party can calculate $$\langle r \rangle_1 = \langle a \rangle_1 - \langle [\langle a \rangle_0 \cdot \langle a \rangle_1] \rangle_0 - \langle a \rangle_1 \cdot \langle a \rangle_1 :$$

$$r = \langle r \rangle_0 + \langle r \rangle_1$$

$$= \langle a \rangle_0 - \langle [\langle a \rangle_0 \cdot \langle a \rangle_1] \rangle_0 - \langle a \rangle_0 \cdot$$

$$\langle a \rangle_0 + \langle a \rangle_1 - \langle [\langle a \rangle_0 \cdot \langle a \rangle_1] \rangle_0 - \langle a \rangle_1 \cdot \langle a \rangle_1$$

$$= \{\langle a \rangle_0 + \langle a \rangle_1\}\{1 - \langle a \rangle_0 - \langle a \rangle_1\}$$

$$= a(1-a)$$

where $\langle r \rangle_0$, $\langle r \rangle_1$, and r are vectors. Therefore, the first data party can generate the first share $RNN_0 = \text{diag}(\langle r \rangle_0)$ of the diagonal matrix $RNN = \text{diag}(r)$ based on $\langle r \rangle_0$, and the second data party can obtain the second share $RNN_1 = \text{diag}(\langle r \rangle_1)$ of the diagonal matrix $RNN = \text{diag}(r)$ based on $\langle r \rangle_1$, where $RNN_0 + RNN_1 = RNN$. The first share $RNN_0$ and the second share $RNN_1$ of the diagonal matrix RNN each can be a diagonal matrix. In an actual processing process, the first data party can use a data element in $\langle r \rangle_0$ as a data element on a main diagonal of $RNN_0$, thereby generating $RNN_0$ based on $\langle r \rangle_0$, and the second data party can use a data element in $\langle r \rangle_1$ as a data element on a main diagonal of $RNN_1$, thereby generating $RNN_1$ based on $\langle r \rangle_1$.

The first data party and the second data party can secretly share the hessian matrix H respectively based on X and $RNN_0$ and based on $RNN_1$. The first data party can obtain the first share $\langle H \rangle_0$ of the hessian matrix, and the second data party can obtain the second share $\langle H \rangle_1$ of the hessian matrix.

The following describes a detailed process of secretly sharing the hessian matrix H by the first data party and the second data party.

The first data party and the second data party can secretly share $X^T RNN_1$ respectively based on X and $RNN_1$. The first data party can obtain $\langle X^T RNN_1 \rangle_0$, and the second data party can obtain $\langle X^T RNN_1 \rangle_1$, where $\langle X^T RNN_1 \rangle_0 + \langle X^T RNN_1 \rangle_1 = X^T RNN_1$.

The first data party and the second data party can further secretly share $\langle X^T RNN_1 \rangle_1 X$ respectively based on X and $\langle X^T RNN_1 \rangle_1$. The first data party can obtain $\langle [\langle X^T RNN_1 \rangle_1 X] \rangle_0$, and the second data party can obtain $\langle [\langle X^T RNN_1 \rangle_1 X] \rangle_1$, where $\langle [\langle X^T RNN_1 \rangle_1 X] \rangle_0 + \langle [\langle X^T RNN_1 \rangle_1 X] \rangle_1 = \langle X^T RNN_1 \rangle_1 X$.

The first data party can calculate $X^T RNN_0 X + \langle X^T RNN_1 \rangle_0 X + \langle [\langle X^T RNN_1 \rangle_1 X] \rangle_0$ as the first share $\langle H \rangle_0$ of the hessian matrix H, and the second data party can use $\langle [\langle X^T RNN_1 \rangle_1 X] \rangle_1$ as the second share $\langle H \rangle_1$ of the hessian matrix H:

$$H = \langle H \rangle_0 + \langle H \rangle_1 = X^T RNN_0 X + \langle X^T RNN_1 \rangle_0 X +$$
$$\langle [\langle X^T RNN_1 \rangle_1 X] \rangle_0 + \langle [\langle X^T RNN_1 \rangle_1 X] \rangle_1$$

$$= X^T RNN_0 X + \langle X^T RNN_1 \rangle_0 X + \langle X^T RNN_1 \rangle_1 X$$

$$= X^T RNN_0 X + X^T RNN_1 X$$

$$= X^T RNN X$$

In some implementations, a third party can send a first share of the random number matrix to the first data party, and send a second share of the random number matrix to the second data party. The sum of the first share of the random number matrix and the second share of the random number matrix is equal to the random number matrix. The first data party can receive the first share of the random number matrix, and the second data party can receive the second share of the random number matrix. As such, in step S13, the first data party can secretly share the second product respectively based on the first share of the random number matrix and the first share of the hessian matrix and based on the second share of the random number matrix and the second share of the hessian matrix. The first data party and the second data party each can obtain a share of the second product. For ease of description, a share obtained by the first data party can be used as a first share of the second product, and a share obtained by the second data party can be used as a second share of the second product. The sum of the first share of the second product and the second share of the second product is equal to the second product.

In some implementations of this implementation, the second data party can perform inversion processing on the second product. Specifically, the first data party can send the first share of the second product to the second data party. The second data party can receive the first share of the second product, and can add the first share of the second product and the second share that is of the second product and that is owned by the second data party, to obtain the second product. Because the second product is a square matrix, the second data party can perform inversion processing on the second product to obtain an inverse matrix of the second product as the second inverse matrix, and can send the second inverse matrix to the first data party. The first data party can receive the second inverse matrix. Or in some other implementations of this implementation, the first data party can perform inversion processing on the second product. Specifically, the second data party can send the second share of the second product to the first data party. The first data party can receive the second share of the second product, and can add the second share of the second product and the first share that is of the second product and that is owned by the first data party, to obtain the second product. Because the second product is a square matrix, the first data party can perform inversion processing on the second product to obtain an inverse matrix of the second product as the second inverse matrix, and can send the second inverse matrix to the second data party. The second data party can receive the second inverse matrix.

The first data party can multiply the first share of the random number matrix and the second inverse matrix, to obtain the first share of the first inverse matrix. The second data party can multiply the second share of the random number matrix and the second inverse matrix, to obtain the second share of the first inverse matrix. The sum of the first share of the first inverse matrix and the second share of the first inverse matrix is equal to the first inverse matrix.

In the previous scenario examples, the first share of the random number matrix can be represented as $\langle R \rangle_0$, and the second share of the random number matrix can be represented as $\langle R \rangle_1$, where $\langle R \rangle_0 + \langle R \rangle_1 = R$. The first data party and the second data party can secretly share the second product HR respectively based on $\langle R \rangle_0$ and $\langle H \rangle_0$ and based on $\langle R \rangle_1$ and $\langle H \rangle_1$. The first data party can obtain the first share $\langle HR \rangle_0$ of the second product, and the second data party can obtain the second share $\langle HR \rangle_1$ of the second product.

The following describes a detailed process of secretly sharing the second product HR by the first data party and the second data party.

The first data party and the second data party can secretly share $<H>_0<R>_1$ respectively based on $<H>_0$ and $<R>_1$. The first data party can obtain $[<H>_0<R>_1]>_0$, and the second data party can obtain $<[<H>_0<R>_1]>_1$, where $<[<H>_0<R>_1]>_0 + <[<H>_0<R>_1]>_1 = <H>_0<R>_1$.

The first data party and the second data party can further secretly share $<H>_1<R>_0$ respectively based on $<R>_0$ and $<H>_1$. The first data party can obtain $<[<H>_1<R>_0]>_0$, and the second data party can obtain $<[<H>_1<R>_0]>_1$, where $<[<H>_1<R>_0]>_0 + <[<H>_1<R>_0]>_1 = <H>_1<R>_0$.

The first data party can calculate $<H>_0<R>_0 + <[<H>_0<R>_1]>_0 + <[<H>_1<R>_0]>_0$ as the first share $<HR>_0$ of the second product, and the second data party can calculate $<H>_1<R>_1 + <[<H>_0<R>_1]>_1 + <[<H>_1<R>_0]>_1$ as the second share $<HR>_1$ of the second product:

$$HR = \langle HR \rangle_0 + \langle HR \rangle_1$$
$$= \langle H \rangle_0 \langle R \rangle_0 + \langle [\langle H \rangle_0 \langle R \rangle_1] \rangle_0 +$$
$$\langle [\langle H \rangle_1 \langle R \rangle_0] \rangle_0 + \langle H \rangle_1 \langle R \rangle_1 + \langle [\langle H \rangle_0 \langle R \rangle_1] \rangle_1 + \langle [\langle H \rangle_1 \langle R \rangle_0] \rangle_1$$
$$= \langle H \rangle_0 \langle R \rangle_0 + \langle H \rangle_0 \langle R \rangle_1 +$$
$$\langle H \rangle_1 \langle R \rangle_0 + \langle H \rangle_1 \langle R \rangle_1$$
$$= (\langle H \rangle_0 + \langle H \rangle_1)(\langle R \rangle_0 + \langle R \rangle_1)$$

Here, the second data party performs inversion processing on the second product HR. Specifically, the first data party can send the first share $<HR>_0$ of the second product to the second data party. The second data party can receive the first share $<HR>_0$ of the second product, can add the first share $<HR>_0$ of the second product and the second share $<HR>_1$ that is of the second product and that is owned by the second data party, to obtain the second product HR, can perform inversion processing on the second product HR to obtain the second inverse matrix $(HR)^{-1}$, and can send the second inverse matrix $(HR)^{-1}$ to the first data party. The first data party can receive the second inverse matrix $(HR)^{-1}$.

The first data party can multiply the second inverse matrix $(HR)^{-1}$ and the first share $<R>_0$ of the random number matrix, to obtain the first share $<H^{-1}>_0$ of the first inverse matrix $H^{-1}$, and the second data party can multiply the second inverse matrix $(HR)^{-1}$ and the second share $<R>_1$ of the random number matrix, to obtain the second share $<H^{-1}>_1$ of the first inverse matrix $H^{-1}$, where $H^{-1} = <H^{-1}>_0 + <H^{-1}>_1 = <R>_0(HR)^{-1} + <R>_1(HR)^{-1} = R \times (HR)^{-1}$.

In some implementations, in step S15, the first data party and the second data party can secretly share the third product respectively based on the first share of the first inverse matrix and the first share of the gradient of the loss function and based on the second share of the first inverse matrix and the second share of the gradient of the loss function. The first data party and the second data party each can obtain a share of the third product. For ease of description, a share obtained by the first data party can be used as a first share of the third product, and a share obtained by the second data party can be used as a second share of the third product. The sum of the first share of the third product and the second share of the third product is equal to the third product.

The first data party can subtract the first share of the third product from the first share of the original model parameter, to obtain the first share of the new model parameter. The second data party can subtract the second share of the third product from the second share of the original model parameter, to obtain the second share of the new model parameter.

It is worthwhile to note that in practice, the new model parameter can be used as a new original model parameter, to repeatedly perform step S1, step S13, and step S15. The model parameter determining method in this implementation is repeatedly executed, so the model parameter of the data processing model can be iteratively optimized and adjusted.

In the previous scenario examples, the first data party and the second data party can secretly share the third product $H^{-1} \times dW$ respectively based on $<H^{-1}>_0$ and $<dW>_0$ and based on $<H^{-1}>_1$ and $<dW>_1$. The first data party can obtain the first share $<H^{-1} \times dW>_0$ of the third product, and the second data party can obtain the second share $<H^{-1} \times dW>_1$ of the third product.

The following describes a detailed process of secretly sharing the third product $H^{-1} \times dW$ by the first data party and the second data party.

The first data party and the second data party can secretly share $<H^{-1}>_0<dW>_1$ respectively based on $<H^{-1}>_0$ and $<dW>_1$. The first data party can obtain $<[<H^{-1}>_0<dW>_1]>_0$, and the second data party can obtain $<[<H^{-1}>_0<dW>_1]>_1$, where $<[<H^{-1}>_0<dW>_1]>_0 + <[<H^{-1}>_0<dW>_1]>_1 = <H^{-1}>_0<dW>_1$.

The first data party and the second data party can further secretly share $<H^{-1}>_1<dW>_0$ respectively based on $<dW>_0$ and $<H^{-1}>_1$. The first data party can obtain $<[<H^{-1}>_1<dW>_0]>_0$, and the second data party can obtain $<[<H^{-1}>_1<dW>_0]>_1$, where $<[<H^{-1}>_1<dW>_0]>_0 + <[<H^{-1}>_1<dW>_0]>_1 = <H^{-1}>_1<dW>_0$.

The first data party can calculate $<H^{-1}>_0<dW>_0 + <[<H^{-1}>_0<dW>_1]>_0 + <[<H^{-1}>_1<dW>_0]>_0$ as the first share $<H^{-1} \times dW>_0$ of the third product, and the second data party can calculate $<H^{-1}>_1<dW>_1 + <[<H^{-1}>_0<dW>_1]>_1 + <[<H^{-1}>_1<dW>_0]>_1$ as the second share $<H^{-1} \times dW>_1$ of the third product:

$$H^{-1} \times dW = \langle H^{-1} \times dW \rangle_0 + \langle H^{-1} \times dW \rangle_1$$
$$= \langle H^{-1} \rangle_0 \langle dW \rangle_0 + \langle [\langle H^{-1} \rangle_0 \langle dW \rangle_1] \rangle_0 +$$
$$\langle [\langle H^{-1} \rangle_1 \langle dW \rangle_0] \rangle_0 + \langle H^{-1} \rangle_1 \langle dW \rangle_1 +$$
$$\langle [\langle H^{-1} \rangle_0 \langle dW \rangle_1] \rangle_1 + \langle [\langle H^{-1} \rangle_1 \langle dW \rangle_0] \rangle_1$$
$$= \langle H^{-1} \rangle_0 \langle dW \rangle_0 + \langle H^{-1} \rangle_0 \langle dW \rangle_1 +$$
$$\langle H^{-1} \rangle_1 \langle dW \rangle_0 + \langle H^{-1} \rangle_1 \langle dW \rangle_1$$
$$= (\langle H^{-1} \rangle_0 + \langle H^{-1} \rangle_1)(\langle dW \rangle_0 + \langle dW \rangle_1)$$

The first data party can calculate $<W'>_0 = <W>_0 - H^{-1} \times dW>_0$, and the second data party can calculate $<W'>_1 = <W>_1 - H^{-1} \times dW>_1$, where $<W'>_0$ represents the first share of the new model parameter, $<W'>_1$ represents the second share of the new model parameter, and W represents the new model parameter: $W' = <W'>_0 + <W'>_1 = <W>_0 - H^{-1} \times dW>_0 + <W>_1 - H^{-1} \times dW>_1 = W - H^{-1} \times dW$.

In this implementation, the first data party and the second data party can cooperatively determine the model parameter of the data processing model by using the SS algorithm without leaking their own data. In addition, because the Newton's method is used, the model parameter determining method in this implementation has a relatively high convergence speed, so a quantity of times of model parameter optimization and adjustment can be reduced, and training efficiency of the data processing model can be improved.

Figure 3:
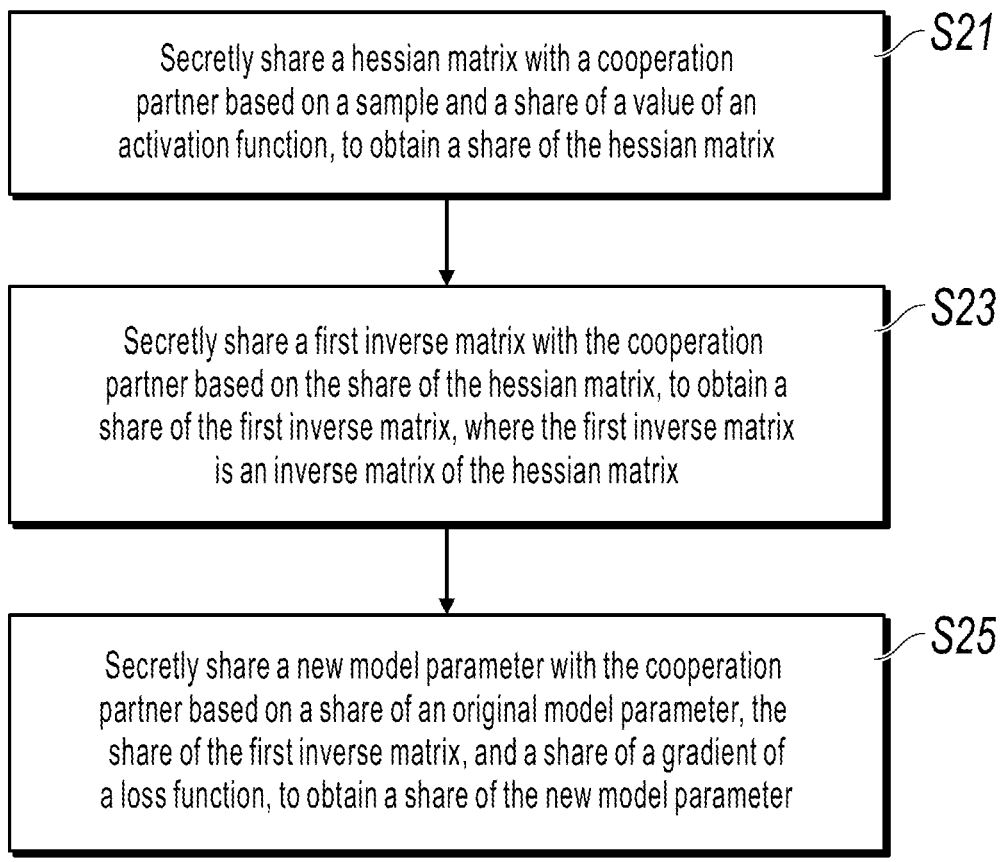
FIG. 3 is a flowchart illustrating a model parameter determining method, according to an implementation of the present specification.

Based on the same inventive concept, the present specification further provides an implementation of another model parameter determining method. This implementation is executed by a first data party, and the first data party can hold feature data and a share of an original model parameter. Referring to FIG. 3, this implementation can include the following steps.

Step S21: Secretly share a hessian matrix with a cooperation partner based on feature data and a share of a value of an activation function, to obtain a share of the hessian matrix.

In some implementations, the cooperation partner can be understood as a data party that performs cooperative security modeling with the first data party, and can be specifically the previous second data party. The first data party can secretly share a value of a polynomial with the cooperation partner based on a share of a first product, to obtain a share of the value of the polynomial as the share of the value of the activation function. The first product can be a product of the original model parameter and the feature data. The first data party can secretly share the first product with the cooperation partner based on the feature data and the share of the original model parameter, to obtain the share of the first product. The polynomial is used to fit the activation function.

The first data party can secretly share a gradient of a loss function with the cooperation partner based on the feature data and the share of the value of the activation function, to obtain a share of the gradient of the loss function.

In some implementations, the first data party can secretly share a diagonal matrix with the cooperation partner based on the share of the value of the activation function, to obtain a share of the diagonal matrix; and can secretly share the hessian matrix with the cooperation partner based on the feature data and the share of the diagonal matrix, to obtain the share of the hessian matrix. For a specific process, references can be made to related descriptions in step S11. Details are omitted here for simplicity.

Step S23: Secretly share a first inverse matrix with the cooperation partner based on the share of the hessian matrix, to obtain a share of the first inverse matrix, where the first inverse matrix is an inverse matrix of the hessian matrix.

In some implementations, the first data party can secretly share a second product with the cooperation partner based on a share of a random number matrix and the share of the hessian matrix, to obtain a share of the second product. The second product can be a product of the random number matrix and the hessian matrix. The first data party can send the share of the second product to the cooperation partner; can receive a second inverse matrix fed back by the cooperation partner, where the second inverse matrix is an inverse matrix of the second product; and can multiply the second inverse matrix and the share of the random number matrix, to obtain the share of the first inverse matrix. For a specific process, references can be made to related descriptions in step S13. Details are omitted here for simplicity.

Or in some other implementations, the first data party can secretly share a second product with the cooperation partner based on a share of a random number matrix and the share of the hessian matrix, to obtain a first share of the second product. The second product can be a product of the random number matrix and the hessian matrix. The first data party can receive a second share that is of the second product and that is sent by the cooperation partner; can determine a second inverse matrix based on the first share of the second product and the second share of the second product, where the second inverse matrix is an inverse matrix of the second product; and can multiple the second inverse matrix and the share of the random number matrix, to obtain the share of the first inverse matrix. For a specific process, references can be made to related descriptions in step S13. Details are omitted here for simplicity.

Step S25: Secretly share a new model parameter with the cooperation partner based on the share of the original model parameter, the share of the first inverse matrix, and the share of the gradient of the loss function, to obtain a share of the new model parameter.

In some implementations, the first data party can secretly share a third product with the cooperation partner based on the share of the first inverse matrix and the share of the gradient of the loss function, to obtain a share of the third product. The third product can be a product of the first inverse matrix and the gradient of the loss function. The first data party can subtract the share of the third product from the share of the original model parameter, to obtain the share of the new model parameter. For a specific process, references can be made to related descriptions in step S15. Details are omitted here for simplicity.

In this implementation, the first data party can cooperate with the cooperation partner to determine the model parameter of the data processing model by using the SS algorithm without leaking their own data, to obtain the share of the new model parameter.

Figure 4:
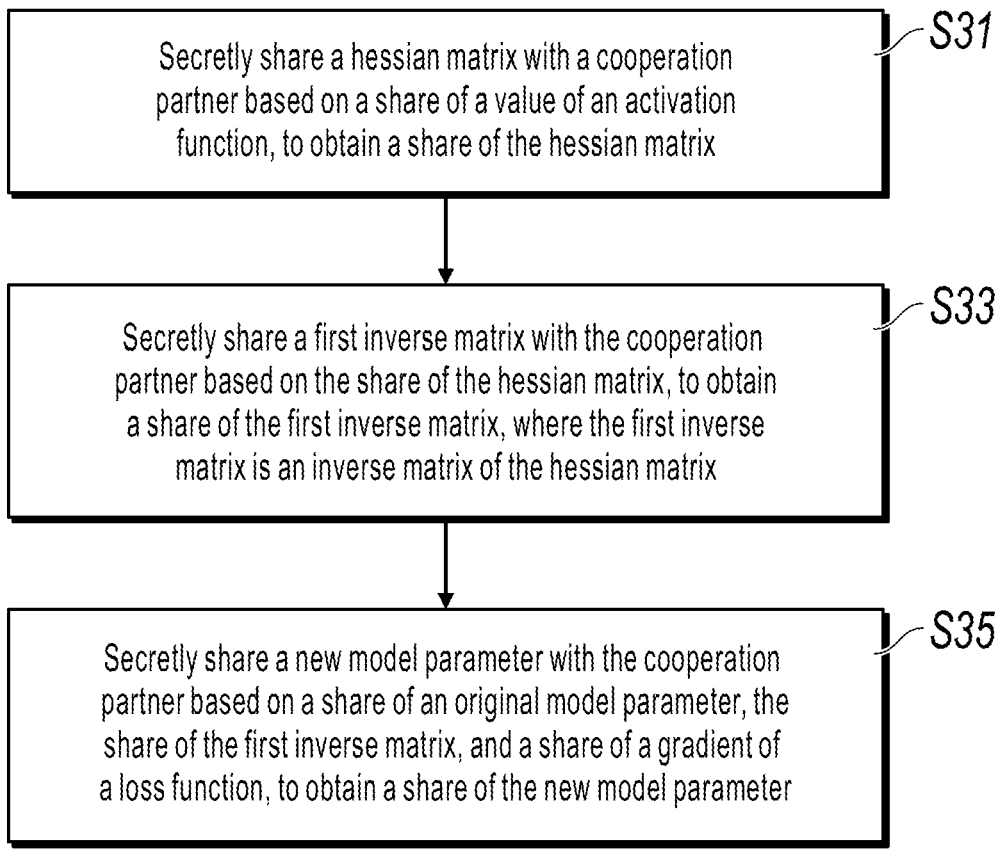
FIG. 4 is a flowchart illustrating a model parameter determining method, according to an implementation of the present specification.

Based on the same inventive concept, the present specification further provides an implementation of another model parameter determining method. This implementation is executed by a second data party, and the second data party can hold a label and a share of an original model parameter. Referring to FIG. 4, this implementation can include the following steps.

Step S31: Secretly share a hessian matrix with a cooperation partner based on a share of a value of an activation function, to obtain a share of the hessian matrix.

In some implementations, the cooperation partner can be understood as a data party that performs cooperative security modeling with the second data party, and can be specifically the previous first data party. The second data party can secretly share a value of a polynomial with the cooperation partner based on a share of a first product, to obtain a share of the value of the polynomial as the share of the value of the activation function. The first product can be a product of the original model parameter and feature data. The second data party can secretly share the first product with the cooperation partner based on the share of the original model parameter, to obtain the share of the first product. The polynomial is used to fit the activation function.

The second data party can secretly share a gradient of a loss function with the cooperation partner based on the label and the share of the value of the activation function, to obtain a share of the gradient of the loss function.

In some implementations, the second data party can secretly share a diagonal matrix with the cooperation partner based on the share of the value of the activation function, to obtain a share of the diagonal matrix; and can secretly share the hessian matrix with the cooperation partner based on the share of the diagonal matrix, to obtain the share of the hessian matrix. For a specific process, references can be made to related descriptions in step S11. Details are omitted here for simplicity.

Step S33: Secretly share a first inverse matrix with the cooperation partner based on the share of the hessian matrix, to obtain a share of the first inverse matrix, where the first inverse matrix is an inverse matrix of the hessian matrix.

In some implementations, the second data party can secretly share a second product with the cooperation partner based on a share of a random number matrix and the share of the hessian matrix, to obtain a share of the second product. The second product can be a product of the random number matrix and the hessian matrix. The second data party can send the share of the second product to the cooperation partner; can receive a second inverse matrix fed back by the cooperation partner, where the second inverse matrix is an inverse matrix of the second product; and can multiply the second inverse matrix and the share of the random number matrix, to obtain the share of the first inverse matrix. For a specific process, references can be made to related descriptions in step S13. Details are omitted here for simplicity.

Or in some other implementations, the second data party can secretly share a second product with the cooperation partner based on a share of a random number matrix and the share of the hessian matrix, to obtain a first share of the second product. The second product can be a product of the random number matrix and the hessian matrix. The second data party can receive a second share that is of the second product and that is sent by the cooperation partner; can determine a second inverse matrix based on the first share of the second product and the second share of the second product, where the second inverse matrix is an inverse matrix of the second product; and can multiple the second inverse matrix and the share of the random number matrix, to obtain the share of the first inverse matrix. For a specific process, references can be made to related descriptions in step S13. Details are omitted here for simplicity.

Step S35: Secretly share a new model parameter with the cooperation partner based on the share of the original model parameter, the share of the first inverse matrix, and the share of the gradient of the loss function, to obtain a share of the new model parameter.

In some implementations, the second data party can secretly share a third product with the cooperation partner based on the share of the first inverse matrix and the share of the gradient of the loss function, to obtain a share of the third product. The third product can be a product of the first inverse matrix and the gradient of the loss function. The second data party can subtract the share of the third product from the share of the original model parameter, to obtain the share of the new model parameter. For a specific process, references can be made to related descriptions in step S15. Details are omitted here for simplicity.

In this implementation, the second data party can cooperate with the cooperation party to determine the model parameter of the data processing model by using the SS algorithm without leaking their own data, to obtain the share of the new model parameter.

Figure 5:
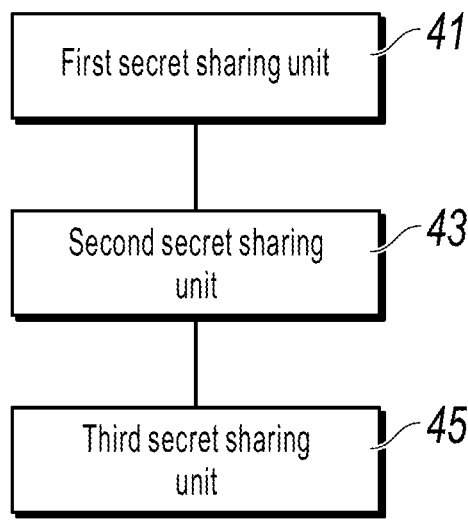
FIG. 5 is a schematic diagram illustrating a model parameter determining apparatus, according to an implementation of the present specification.

Based on the same inventive concept, the present specification further provides an implementation of a model parameter determining apparatus. Referring to FIG. 5, this implementation can be applied to a first data party, and can include the following units: a first SS unit 41, configured to secretly share a hessian matrix with a cooperation partner based on feature data and a share of a value of an activation function, to obtain a share of the hessian matrix; a second SS unit 43, configured to secretly share a first inverse matrix with the cooperation partner based on the share of the hessian matrix, to obtain a share of the first inverse matrix, where the first inverse matrix is an inverse matrix of the hessian matrix; and a third SS unit 45, configured to secretly share a new model parameter with the cooperation partner based on a share of an original model parameter, the share of the first inverse matrix, and a share of a gradient of a loss function, to obtain a share of the new model parameter.

Figure 6:
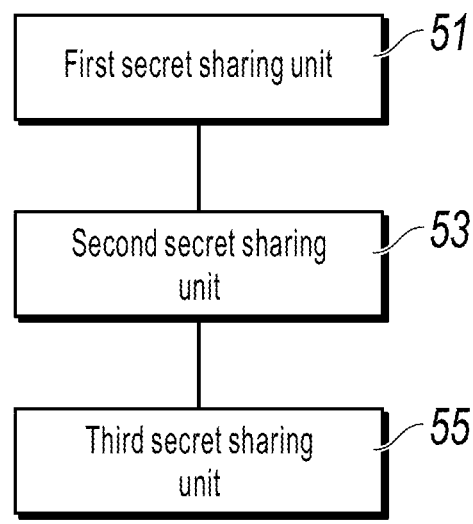
FIG. 6 is a schematic diagram illustrating a model parameter determining apparatus, according to an implementation of the present specification.

Based on the same inventive concept, the present specification further provides an implementation of a model parameter determining apparatus. Referring to FIG. 6, this implementation can be applied to a second data party, and can include the following units: a first SS unit 51, configured to secretly share a hessian matrix with a cooperation partner based on a share of a value of an activation function, to obtain a share of the hessian matrix; a second SS unit 53, configured to secretly share a first inverse matrix with the cooperation partner based on the share of the hessian matrix, to obtain a share of the first inverse matrix, where the first inverse matrix is an inverse matrix of the hessian matrix; and a third SS unit 55, configured to secretly share a new model parameter with the cooperation partner based on a share of an original model parameter, the share of the first inverse matrix, and a share of a gradient of a loss function, to obtain a share of the new model parameter.

Figure 7:
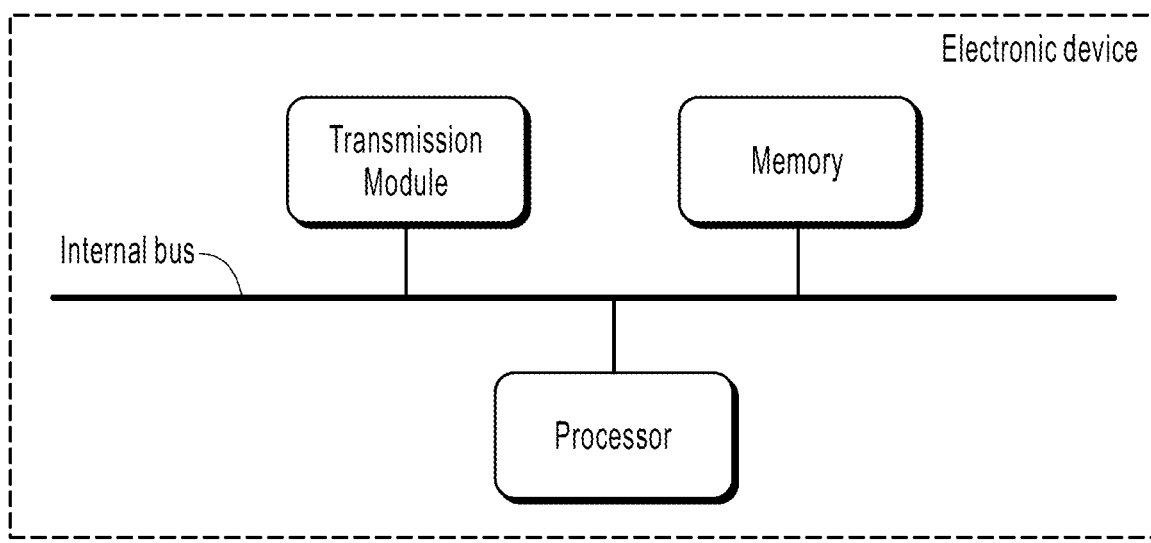
FIG. 7 is a function structural diagram illustrating an electronic device, according to an implementation of the present specification.

The following describes an implementation of an electronic device in the present specification. FIG. 7 is a schematic diagram illustrating a hardware structure of the electronic device in this implementation. As shown in FIG. 7, the electronic device can include one or more processors (only one processor is shown in the figure), memories, and transmission modules. Certainly, a person of ordinary skill in the art can understand that the hardware structure shown in FIG. 7 is merely an example, and does not impose a limitation on the hardware structure of the electronic device. In practice, the electronic device can further include more or fewer component units than those shown in FIG. 7, or has a configuration different from the configuration shown in FIG. 7.

The memory can include a high-speed random access memory, or can include a non-volatile memory, such as one or more magnetic storage apparatuses, a flash memory, or another non-volatile solid-state memory. Certainly, the memory can further include a remotely disposed network memory. The remotely disposed network memory can be connected to the electronic device through a network such as the Internet, an intranet, a local area network, and a mobile communications network. The memory can be configured to store a program instruction or a module of application software, for example, at least one of the program instruction or the module in the implementation corresponding to FIG. 3 in the present specification, or the program instruction or the module in the implementation corresponding to FIG. 4 in the present specification.

The processor can be implemented by using any suitable method. For example, the processor can be a microprocessor or a processor and a computer readable medium storing computer readable program code (such as software or firmware) that can be executed by the microprocessor or the processor, a logic gate, a switch, an application-specific integrated circuit (ASIC), a programmable logic controller, or a built-in microcontroller. The processor can read and execute a program instruction or a module in the memory.

The transmission module can be configured to transmit data through a network such as the Internet, an intranet, a local area network, or a mobile communications network.

It is worthwhile to note that the implementations in the present specification are described progressively. For same or similar parts in the implementations, references can be made to each other. Each implementation focuses on a difference from other implementations. Especially, the apparatus implementation and the electronic device implementation are basically similar to the method implementation, and therefore are described briefly. For related parts, refer to partial descriptions in the method implementation. In addition, it can be understood that after reading the present specification, a person skilled in the art can figure out any combination of some or all of the implementations enumerated in the present specification without creative efforts. These combinations are also within the scope of disclosure and protection of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in the implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumption electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method, comprising:
obtaining, by a first data party device, a first share of a Hessian matrix for a data processing model, wherein the Hessian matrix is secretly shared between the first data party device and a second data party device of a cooperation partner such that the first data party device and the second data party device have respective shares of the Hessian matrix, and wherein the Hessian matrix is based on feature data for the data processing model and an activation function for the data processing model;
obtaining, by the first data party device and using secret sharing with the second data party device, a first share of a product of a random number matrix and the Hessian matrix;
determining, by the first data party device and using secret sharing with the second data party device, a first share of a product of a first inverse matrix and a gradient of a loss function of the data processing model, wherein the first inverse matrix is an inverse of the Hessian matrix; and
determining a first share of a new model parameter for the data processing model based on an original model parameter of the data processing model and the first share of the product of the first inverse matrix and the gradient of the loss function.

2. The computer-implemented method of claim 1, further comprising updating the data processing model with the first share of the new model parameter and a second share of the new model parameter obtained from the second data party device.

3. The computer-implemented method of claim 2, wherein the second share of the new model parameter is based on the original model parameter of the data processing model and a second share of the product of the first inverse matrix and the gradient of the loss function.

4. The computer-implemented method of claim 1, wherein the data processing model is a machine learning model and the new model parameter comprises one of a weight or a bias of the machine learning model.

5. The computer-implemented method of claim 1, further comprising:
providing, to the second data party device, the first share of the product of the random number matrix and the Hessian matrix;
in response to providing the first share of the product of the random number matrix and the Hessian matrix to the second data party device, receiving, by the first data party device, a second inverse matrix from the second data party device, wherein the second inverse matrix is an inverse of the product of the random number matrix and the Hessian matrix; and
determining, by the first data party device, the first share of the first inverse matrix based on the second inverse matrix and a first share of the random number matrix.

6. The computer-implemented method of claim 5, further comprising determining, by the first data party device, the first inverse matrix based on the first share of the first inverse matrix and a second share of the first inverse matrix received from the second data party device, wherein the second share of the first inverse matrix is based on the second inverse matrix and a second share of the random number matrix.

7. The computer-implemented method of claim 1, wherein determining the first share of the new model parameter comprises subtracting the first share of the product of the first inverse matrix and the gradient of the loss function from the original model parameter.

8. The computer-implemented method of claim 7, wherein a second share of the product of the first inverse matrix and the gradient of the loss function comprises a product of the first inverse matrix and a second share of the gradient of the loss function secretly shared with the second data party device.

9. A non-transitory, computer-readable medium storing one or more instructions executable by a computer system of a first data party device to perform operations comprising:
obtaining a first share of a Hessian matrix for a data processing model, wherein the Hessian matrix is secretly shared between the first data party device and a second data party device of a cooperation partner such that the first data party device and the second data party device have respective shares of the Hessian matrix, and wherein the Hessian matrix is based on feature data for the data processing model and an activation function for the data processing model;
obtaining, using secret sharing with the second data party device, a first share of a product of a random number matrix and the Hessian matrix;
determining, using secret sharing with the second data party device, a first share of a product of a first inverse matrix and a gradient of a loss function of the data processing model, wherein the first inverse matrix is an inverse of the Hessian matrix; and
determining a first share of a new model parameter for the data processing model based on an original model parameter of the data processing model and the first share of the product of and the gradient of the loss function.

10. The non-transitory, computer-readable medium of claim 9, wherein the operations comprise updating the data processing model with the first share of the new model parameter and a second share of the new model parameter obtained from the second data party device.

11. The non-transitory, computer-readable medium of claim 9, wherein the data processing model is a machine learning model and the new model parameter comprises one of a weight or a bias of the machine learning model.

12. The non-transitory, computer-readable medium of claim 9, wherein the operations comprise:
providing, to the second data party device, the first share of the product of the random number matrix and the Hessian matrix;
in response to providing the first share of the product of the random number matrix and the Hessian matrix to the second data party device, receiving a second inverse matrix from the second data party device, wherein the second inverse matrix is an inverse of the product of the random number matrix and the Hessian matrix; and
determining the first share of the first inverse matrix based on the second inverse matrix and a first share of the random number matrix.

13. The non-transitory, computer-readable medium of claim 12, wherein the operations comprise determining the first inverse matrix based on the first share of the first inverse matrix and a second share of the first inverse matrix received from the second data party device, wherein the second share of the first inverse matrix is based on the second inverse matrix and a second share of the random number matrix.

14. The non-transitory, computer-readable medium of claim 9, wherein determining the first share of the new model parameter comprises subtracting the first share of the product of the first inverse matrix and the gradient of the loss function from the original model parameter.

15. A computer-implemented system, comprising:
one or more computers of a first data party device; and
one or more computer memory devices interoperably coupled with the one or more computers and having tangible, non-transitory, machine-readable media storing one or more instructions that, when executed by the one or more computers, perform operations comprising:
obtaining a first share of a Hessian matrix for a data processing model, wherein the Hessian matrix is secretly shared between the first data party device and a second data party device of a cooperation partner such that the first data party device and the second data party device have respective shares of the Hessian matrix, and wherein the Hessian matrix is based on feature data for the data processing model and an activation function for the data processing model;
obtaining, using secret sharing with the second data party device, a first share of a product of a random number matrix and the Hessian matrix;
determining, using secret sharing with the second data party device, a first share of a product of a first inverse matrix and a gradient of a loss function of the data processing model, wherein the first inverse matrix is an inverse of the Hessian matrix; and
determining a first share of a new model parameter for the data processing model based on an original model parameter of the data processing model and the first share of the product of the first inverse matrix and the gradient of the loss function.

16. The computer-implemented system of claim 15, wherein the operations comprise updating the data processing model with the first share of the new model parameter and a second share of the new model parameter obtained from the second data party device.

17. The computer-implemented system of claim 16, wherein the second share of the new model parameter is based on the original model parameter of the data processing model and a second share of the product of the first inverse matrix and the gradient of the loss function.

18. The computer-implemented system of claim 15, wherein the data processing model is a machine learning model and the new model parameter comprises one of a weight or a bias of the machine learning model.

19. The computer-implemented system of claim 15, wherein the operations comprise:
   providing, to the second data party device, the first share of the product of the random number matrix and the Hessian matrix;
   in response to providing the first share of the product of the random number matrix and the Hessian matrix to the second data party device, receiving a second inverse matrix from the second data party device, wherein the second inverse matrix is an inverse of the product of the random number matrix and the Hessian matrix; and
   determining the first share of the first inverse matrix based on the second inverse matrix and a first share of the random number matrix.

20. The computer-implemented system of claim 19, wherein the operations comprise determining the first inverse matrix based on the first share of the first inverse matrix and a second share of the first inverse matrix received from the second data party device, wherein the second share of the first inverse matrix is based on the second inverse matrix and a second share of the random number matrix.

21. The computer-implemented system of claim 15, wherein determining the first share of the new model parameter comprises subtracting the first share of the product of the first inverse matrix and the gradient of the loss function from the original model parameter.

22. The computer-implemented system of claim 15, wherein a second share of the product of the first inverse matrix and the gradient of the loss function comprises a product of the first inverse matrix and a second share of the gradient of the loss function secretly shared with the second data party device.

* * * * *